US012773738B2

(12) United States Patent
Downie

(10) Patent No.: US 12,773,738 B2
(45) Date of Patent: Oct. 27, 2026

(54) METHOD OF MACHINING HOLES AND CHAMFERS IN CERAMIC MATRIX COMPOSITES

(71) Applicant: Rolls-Royce High Temperature Composites Inc., Cypress, CA (US)

(72) Inventor: Chris Downie, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 614 days.

(21) Appl. No.: 18/354,130

(22) Filed: Jul. 18, 2023

(65) Prior Publication Data

US 2024/0024963 A1 Jan. 25, 2024

Related U.S. Application Data

(60) Provisional application No. 63/390,823, filed on Jul. 20, 2022.

(51) Int. Cl.
*B23B 35/00* (2006.01)
*B23B 51/00* (2006.01)
*B23B 51/10* (2006.01)

(52) U.S. Cl.
CPC .......... *B23B 35/00* (2013.01); *B23B 51/0018* (2013.01); *B23B 51/0027* (2013.01);
(Continued)

(58) Field of Classification Search
CPC ... B23B 35/00; B23B 35/005; B23B 51/0027; B23B 51/0018; B23B 51/102;
(Continued)

(56) References Cited

U.S. PATENT DOCUMENTS 8,206,067 B2 6/2012 Turrini
9,797,263 B2 10/2017 Varney et al.
(Continued)

FOREIGN PATENT DOCUMENTS

CN 104889466 A 9/2015
WO WO-2018000009 A1 * 1/2018 ......... B23B 51/0027

OTHER PUBLICATIONS

Gardiner, Ginger; "Fusing waterjet, laser for efficiency in CFRP/CMC machining"; May 2, 2019; CompositesWorld; https://www.compositesworld.com/blog/post/fusing-waterjet-laser-for-efficiency-in-cfrpcmc-machining (Year: 2019).*
(Continued)

*Primary Examiner* — Matthew P Travers
(74) *Attorney, Agent, or Firm* — Shumaker & Sieffert, P.A.

(57) ABSTRACT

A method of forming an aperture in a ceramic matrix composite material is provided. The method may comprise drilling a pilot hole into the ceramic matrix composite material and spiral machining the pilot hole to enlarge a diameter of the pilot hole, wherein the enlarged pilot hole is the aperture in the ceramic matrix composite material. The method may comprise spiral machining the pilot hole in a radial direction with a tool to enlarge a diameter of the pilot hole until the aperture in the ceramic matrix composite material is formed. The tool may have a first diameter in a section of the tool and a second diameter on either side of the section of the tool or on both sides of the section of the tool, wherein the second diameter is larger than the first diameter.

20 Claims, 4 Drawing Sheets

(52) U.S. Cl.
CPC ......... *B23B 51/102* (2013.01); *B23B 2220/04* (2013.01); *B23B 2226/18* (2013.01); *B23B 2226/27* (2013.01); *B23B 2226/31* (2013.01); *B23C 2220/52* (2013.01)

(58) Field of Classification Search
CPC ............ B23B 2220/04; B23B 2270/54; B23B 2226/18; B23B 2226/27-275; B23B 2226/72; B23C 5/12
See application file for complete search history.

(56) References Cited

U.S. PATENT DOCUMENTS

| | | | | |
|---|---|---|---|---|
| 10,024,175 | B2 | 7/2018 | Varney | |
| 2009/0022561 | A1 | 1/2009 | Winebrenner | |
| 2022/0355388 | A1 * | 11/2022 | Harada | B23B 27/20 |

OTHER PUBLICATIONS

Translation of WO2018000009 (Year: 2018).*
Diaza et al., The new challenges of machining Ceramic Matrix Composites (CMCs): Review of surface integrity, dated 2019, pp. 1-13, International Journal of Machine Tools and Manufacture 139 (2019) 24-36.
Wang et al., Improving hole exit quality in rotary ultrasonic machining of ceramic matrix composites using a compound step-taper drill, dated 2016, pp. 1-8, Ceramics International 42 (2016) 13387-13394.
Xing et al., Assessment in drilling of C/C—SiC composites using brazed diamond drills, dated 2017, pp. 1-13, Journal of Manufaturing Processes 26 (2016) 31-43.

* cited by examiner

METHOD OF MACHINING HOLES AND CHAMFERS IN CERAMIC MATRIX COMPOSITES

CROSS REFERENCE TO RELATED APPLICATIONS

The present patent document claims the benefit of priority under 35 U.S.C. § 119(e) to U.S. Provisional Patent Application No. 63/390,823, which was filed on Jul. 20, 2022, and is hereby incorporated by reference in its entirety.

TECHNICAL FIELD

This disclosure relates to ceramic matrix composites and, in particular, to machining methods for ceramic matrix composites.

BACKGROUND

Present methods of machining ceramic matrix composites suffer from a variety of drawbacks, limitations, and disadvantages. Accordingly, there is a need for inventive systems and methods described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A method of forming an aperture in a ceramic matrix composite material is provided. The method may comprise drilling a pilot hole into the ceramic matrix composite material and spiral machining the pilot hole to enlarge a diameter of the pilot hole, wherein the enlarged pilot hole is the aperture in the ceramic matrix composite material. The method may comprise spiral machining the pilot hole in a radial direction with a tool to enlarge a diameter of the pilot hole until the aperture in the ceramic matrix composite material is formed. The tool may have a first diameter in a section of the tool and a second diameter on either side of the section of the tool or on both sides of the section of the tool, wherein the second diameter is larger than the first diameter.

One interesting feature of the systems and methods described below may be that the described method of forming holes in a ceramic matrix composite material may eliminate or lessen the amount of splintering or delamination at the cut exit that is caused by conventional drilling methods and rotary ultrasonic machining methods.

Alternatively, or in addition, an interesting feature of the systems and methods described below may be that the described method of forming holes may eliminated or lessen the need to reduce feed rate and speeds of the tooling to try to lessen the amount of delamination. As a result, the described methods may lead to faster and more efficient methods of forming holes in ceramic matrix composite materials.

Alternatively, or in addition, an interesting feature of the systems and methods described below may be that the described method of forming holes may lead to stronger holes. Certain holes in ceramic matrix composite materials used, for example, in turbine engine parts, may be heavily loaded during operation of the engine. Delamination and other defects caused by conventional tooling methods can weaken the holes, therefore the described method may produce stronger holes with fewer or no defects.

Figure 1:
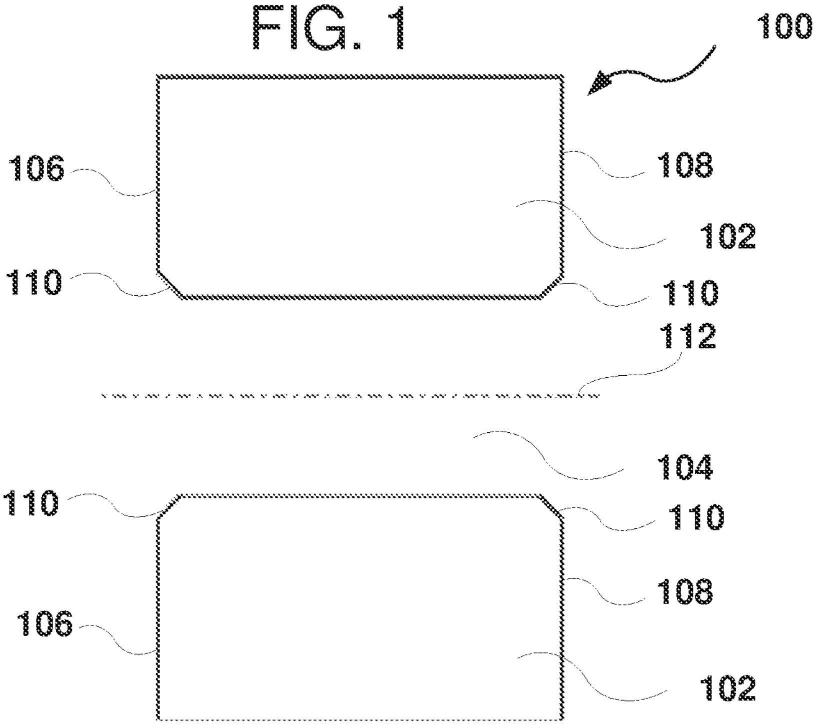
FIG. 1 illustrates a cross-sectional view of an example of a finished aperture.

FIG. 1 illustrates an example of a finished hole in a ceramic matrix composite material part 100. The part 100 may comprise a ceramic matrix composite material 102, one or more apertures or holes 104, a first side 106, and second side 108, and a chamfer 110. The part 100 may be made of the ceramic matrix composite material 102. The one or more apertures or holes 104 may extend through the part 100, for example, from the first side 106 of the part 100 to the second side 108 of the part 100. The aperture or hole 104 may comprise a chamfer 110 at an end of the aperture 104 at one or both sides 106, 108 of the part 100. The end of the aperture 104 may refer to where the aperture 104 intersects a surface or face of the part 100, for example, where the aperture 104 intersects the outward facing surface on one of both sides 106, 108 of the part. A central axis 112 may run axially thought the center of the hole 104. The aperture or hole 104 may be the pilot hole 200 (shown in FIG. 2) once it has been enlarged.

The part 100 may be any part or component made of a ceramic matrix composite material. The ceramic matrix composite part 100 may, for example, comprise a ceramic fiber preform having the approximate shape of a ceramic matrix composite part and that that has been infiltrated with a matrix material during, for example, chemical vapor infiltration, slurry infiltration, and melt infiltration to form a ceramic matrix composite material. The ceramic matrix composite material may comprise a three-dimensional framework of, for example, continuous ceramic fibers. Examples of the ceramic fibers may include carbon (C), silicon carbide (SiC), alumina ($Al_2O_3$) and mullite ($Al_2O_3$—SiO2) fibers. In the context of this disclosure, carbon and carbon fibers may be considered ceramic material even if carbon and carbon fibers are not generally considered ceramic material. The ceramic fibers (or simply "fibers") may be arranged in fiber tows (or simply "tows").

Chemical vapor infiltration and/or any other suitable deposition process known in the art may form a rigidized fiber preform by depositing a matrix material such as silicon carbide on the fiber preform. During slurry infiltration, the rigidized fiber preform may be infiltrated with a slurry comprising ceramic particles and optionally reactive elements/particles to form an impregnated fiber preform or "green body," in other words, a fiber preform loaded with particulate matter. Typically, the impregnated fiber preform comprises a loading level of particulate matter from about 40 vol. % to about 60 vol. %, with the remainder being porosity. During melt infiltration, a molten material may be infiltrated into the fiber preform (which may be a rigidized and/or impregnated fiber preform as described above). The molten material may, for example, consist essentially of silicon (e.g., elemental silicon and any incidental impurities) or may comprise a silicon-rich alloy.

The part 100 may be any part or component that had undergone a ceramic matrix composite manufacturing process. The part 100 may be, for example, a turbine engine component, such as a seal segment or any other ceramic matrix composite turbine engine part that had to have one or more holes formed in the part 100 after the ceramic matrix composite process. The part 100 may include the first side 106 and the second side 108, wherein the first and second sides 106, 108 are opposite from each other. The aperture or hole 104 may fully extend through a thickness of the part 100 from the first side 106 to the second side 108. The hole 104 may include a chamfer 110 at the first 106 and/or second sides 108, wherein the chamfer 110 transitions between the face of the first 106 or second side 108 and the inner surface of the hole 104. The chamfer may, for example, be at a 45 degree angle with the first 106 or second side 108.

Figure 2:
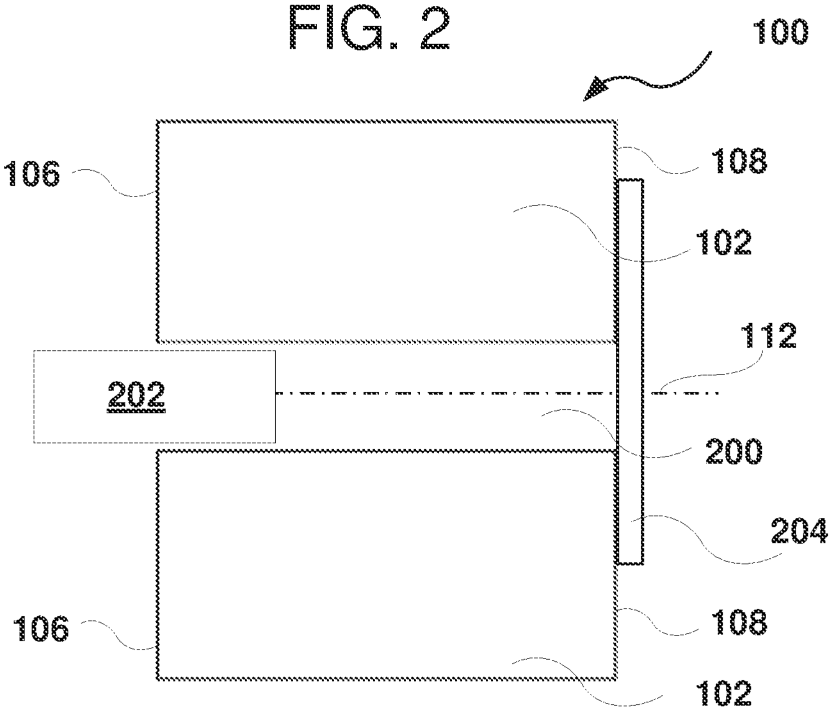
FIG. 2 illustrates a cross-sectional view of an example of a pilot hole.

FIG. 2 illustrates an example of a pilot hole 200 that is first formed during the process of forming the finished hole 104 (shown in FIG. 1). The pilot hole 200 may be drilled through the thickness of the part 100 from the first side 106 through to the second side 108. The pilot hole 200 may have a diameter of 50%-70% of the diameter of the finished hole 104. The pilot hole 200 may be formed via a first tool 202, which may be, for example, using a CNC machine or a laser microjet.

During formation of the pilot hole, a backing material 204 may be applied to the second side 108 of the part 100 to help minimize delamination. The backing 204 may be held onto the part 100 by, for example, clamps. Additionally or alternatively, the backing 204 may be adhered to the part 100 using an adhesive, such as glue. The backing 204 may be placed on the second side 108 prior to formation of the pilot hole 200 and may be removed after formation of the pilot hole 200 and prior to the formation of the finished hole 104. The backing 204 may be, for example, a rubber material, for example, a bicon rubber gasket. The backing 204 can conform to the potentially uneven surface of the part 100. Additionally or alternatively, no backing 204 may be used during formation of the hole 104. Additionally or alternatively, the backing 204 may be, for example, a fiberglass material.

Figure 3:
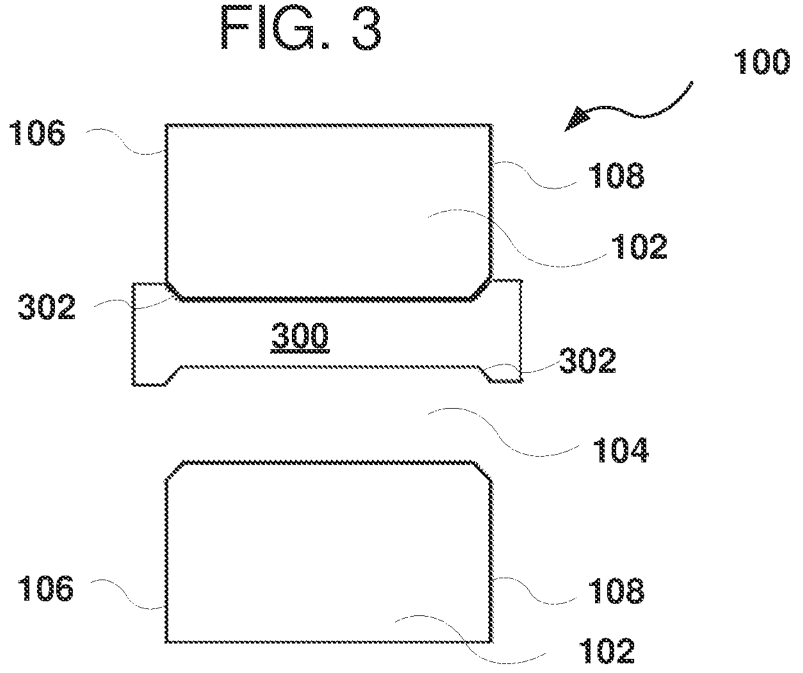
FIG. 3 illustrates a cross-sectional view of an example hole and tooling.

FIG. 3 illustrates an example of the finished hole 104 and a second tool 300 that is used during the second step in forming the finished hole 104 after the pilot hole 200 (shown in FIG. 2) is formed. The second tool 300 may fit within the diameter of the pilot hole and extend through the entire thickness of the part 100. The tooling 300 may, for example, be a tool. The tool may be, for example, any tool capable of forming a hole, for example, a cutting or drilling tool, such as a milling cutter, specifically a diamond milling cutter, or a drill bit. The second tool 300 may, for example, be a diamond tool. The second tool 300 may, for example, be spool-like in shape and include a chamfer feature 302 on one or both ends of the tool 300 that enables the formation of the chamfer 110 on the part 100. The chamfer feature 302 may have a larger diameter than a diameter of a section of the tool 300 near the middle or center of the second tool 300, which creates a larger diameter of the hole 104 at either side 106, 108 of the hole 104 than a diameter of the hole 104 midway through the part 100. The use of the second tool 300 with the chamfer feature 302 to form the chamfer 110 on the hole 104 and enlarge the diameter of the hole 104 simultaneously eliminates the need for an additional operation dedicated to forming an edge break. The enlarged pilot hole 200 may be the aperture or hole 104.

Figure 4:
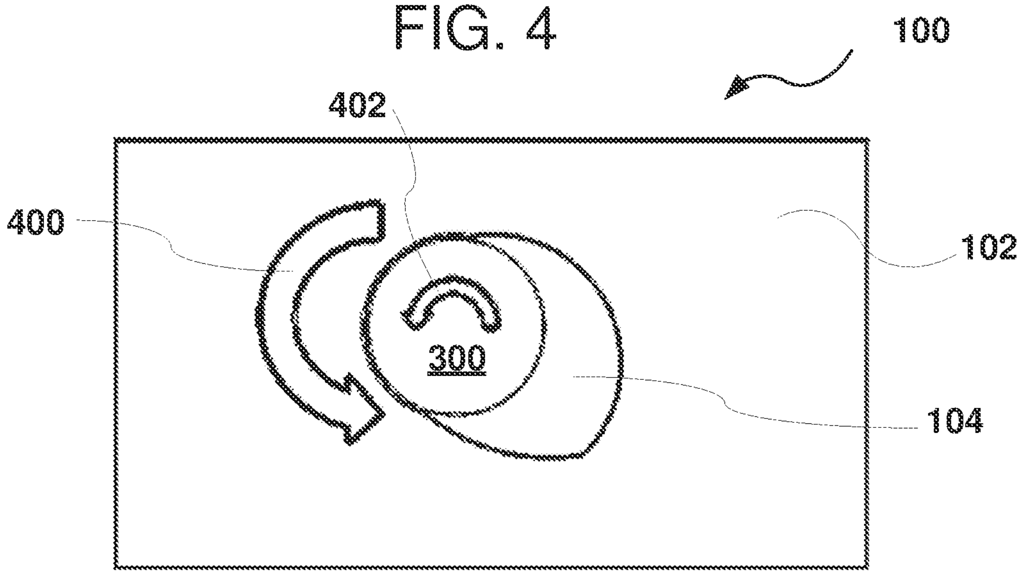
FIG. 4 illustrates a view of an example hole and tooling.

FIG. 4 illustrates a top view of the part 100 and tool 300 forming a partially finished hole 104. The tool 300 may be fully inserted into the pilot hole 200 (shown in FIG. 2) and then rotated in a spiral direction so that the hole 104 only experiences force in the radial direction, and no force in the axial direction, during formation of the finished hole with the tooling 300. The tool 300 may rotate, for example, in a counter-clockwise direction 402 as shown in FIG. 4, while also traveling in a spiral cutting path 400 in, for example, the counter-clockwise direction to enlarge the diameter of the pilot hole 200. The tool 300 may travel in a spiral direction while moving radially outward until the needed diameter of the finished hole 104 is achieved.

Figure 5:
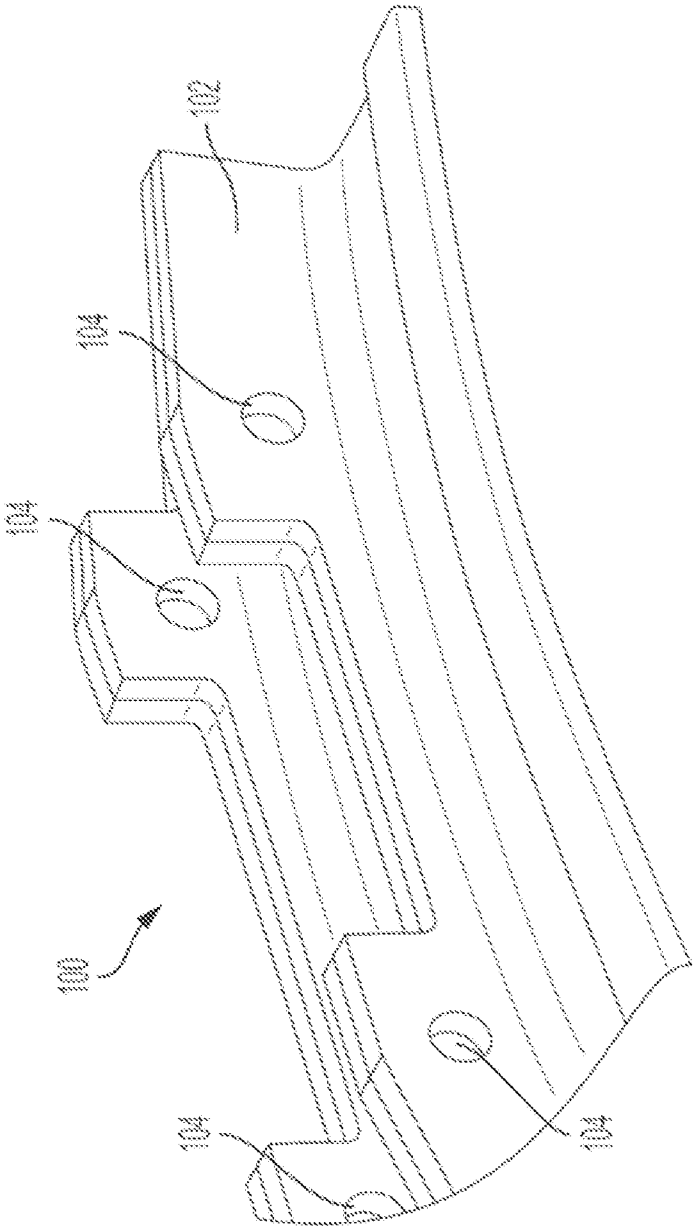
FIG. 5 illustrates an example of a part made from a ceramic matrix composite material.

FIG. 5 illustrates an example of a ceramic matrix composite material part 100. The part 100 may be a seal segment as shown in FIG. 5. The part 100 may, for example, have multiple hole 104 formed in the part 100. For example, the seal segment may have four or more holes where the seal segment is mounted to an engine.

Figure 6:
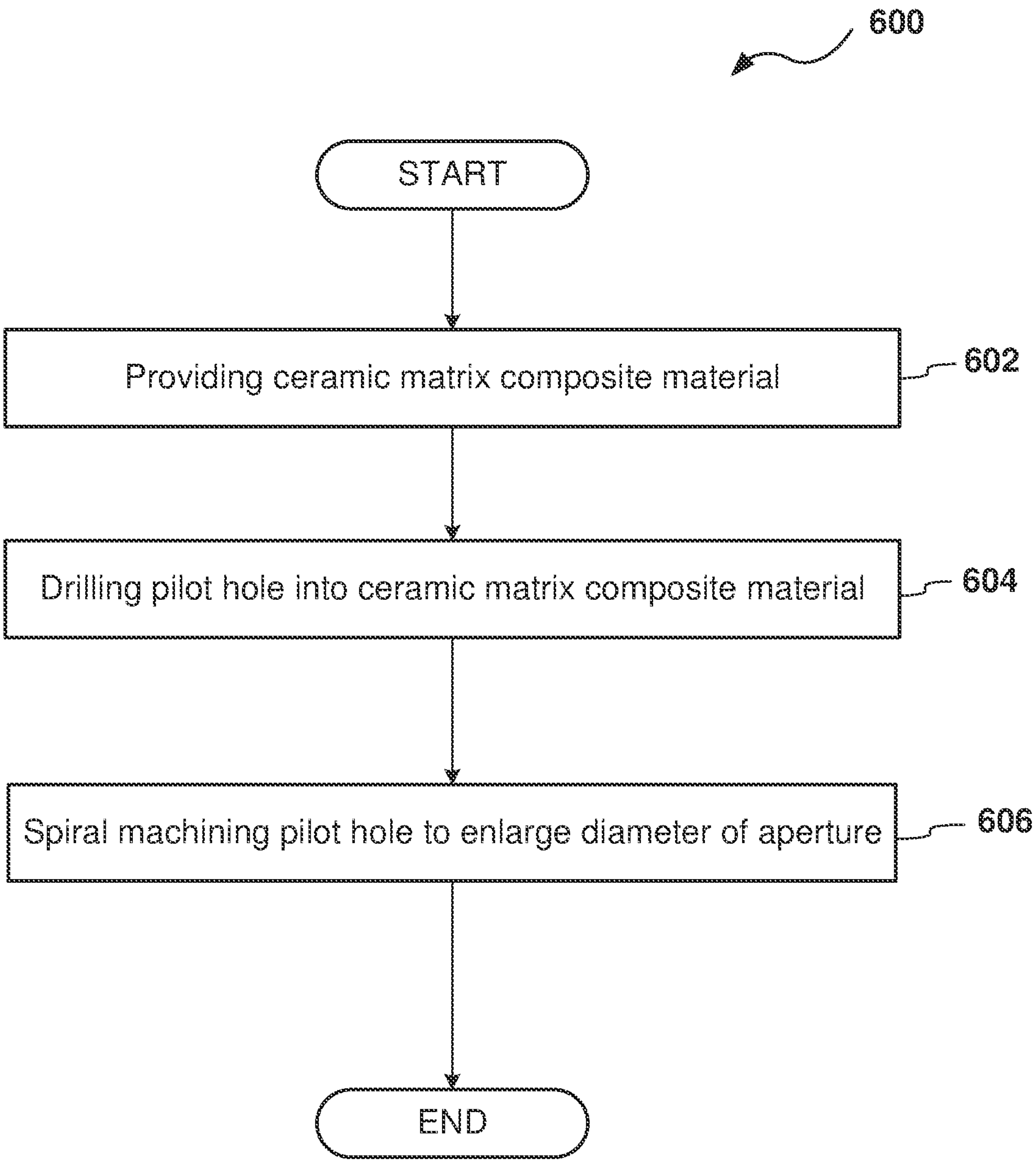
FIG. 6 illustrates an example method of forming a hole.

FIG. 6 illustrates a flow diagram of an example of steps 600 to manufacture the finished hole 104. The steps may include additional, different, or fewer operations than illustrated in FIG. 6. The steps may be executed in a different order than illustrated in FIG. 6. The ceramic matrix composite part 100 may be provided (602). The pilot hole 200 may be drilled (604) into the ceramic matrix composite part 100 at the desired location of the finished hole 104. The pilot hole 200 may be spiral machined (606) to enlarge the diameter of the hole to be the desired size of the finished hole.

Conventional methods of drilling holes into ceramic matrix composite parts may have a cycle time of approximately twenty minutes per hole because feed times and drilling speeds have to be reduced to minimize delamination. Using the methods described, the pilot hole 200 may take between one to ten minutes to form (604) depending on the method used (a laser microjet taking approximately one minute while a diamond tool may take approximately ten minutes). The spiral machining (606) to form the final diameter may take approximately two minutes. Therefore, the presently described methods may take as little as three minutes to form a hole or a maximum of twelve minutes.

Each component may include additional, different, or fewer components. For example, the part 100 may have one or multiple holes 104. Additionally or alternatively, the tooling 202, 300 may include multiple components. Additionally or alternatively, the method 600 may be implemented with additional, different, or fewer components. For example, there may be additional steps for forming the ceramic matrix composite material part 100. Additionally or alternatively, there may be additional or fewer tooling or machining steps 604, 606. Additionally or alternatively, the logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of forming an aperture in a ceramic matrix composite material, the method comprising: drilling a pilot hole into the ceramic matrix composite material; and spiral machining the pilot hole to enlarge a diameter of the pilot hole, wherein the enlarged pilot hole is the aperture in the ceramic matrix composite material.

A second aspect relates to the method of aspect 1, wherein a diameter of the pilot hole is 50%-70% of a final diameter of the aperture.

A third aspect relates to the method of any preceding aspect wherein the spiral machining is in-plane spiral machining.

A fourth aspect relates to the method of any preceding aspect wherein the step of spiral machining comprises inserting a tool into the pilot hole, moving the tool in a spiral path to enlarge the diameter of the aperture A fifth aspect relates to the method of any preceding aspect wherein only a radial force is applied to the aperture during the spiral machining step.

A sixth aspect relates to method of any preceding aspect wherein the spiral machining is done using a diamond milling tool.

A seventh aspect relates to the method of any preceding aspect wherein a chamfer is created on either end of the aperture during the spiral machining process.

An eighth aspect relates to the method of any preceding aspect wherein the spiral machining is performed with a tool having a first diameter in a section of the tool and a second diameter on either side of the section of the tool or on both sides of the section of the tool, wherein the second diameter is larger than the first diameter.

A ninth aspect relates to the method of any preceding aspect wherein a shape of the tool formed by the first and second diameters creates a chamber on either end of the aperture during the spiral machining process.

A tenth aspect relates to the method of any preceding aspect, further comprising applying a backing material to the ceramic matrix composite material, wherein the backing material covers an area of the aperture to be formed.

An eleventh aspect relates to the method of any preceding aspect, wherein the backing material is fiberglass.

A twelfth aspect relates to the method of any preceding aspect further comprising holding the backing material in place by clamps.

A thirteenth aspect relates to the method of any preceding aspect further comprising removing the backing material after drilling of the pilot hole.

A fourteenth aspect relates to the method of any preceding aspect further comprising making the pilot hole with a laser microjet.

A fifteenth aspect relates to the method of any preceding aspect further comprising making the pilot hole with diamond tooling.

A sixteenth aspect relates to a method of forming an aperture in a ceramic matrix composite material, the method comprising: drilling a pilot hole into the ceramic matrix composite material; and spiral machining the pilot hole in a radial direction with a tool to enlarge a diameter of the pilot hole until the aperture in the ceramic matrix composite material is formed, wherein the enlarged pilot hole is the aperture, wherein the tool has a first diameter in a section of the tool and a second diameter on either side of the section of the tool or on both sides of the section of the tool, wherein the second diameter is larger than the first diameter.

A seventeenth aspect relates to the method of any preceding aspect wherein the second diameter is disposed at an end of the aperture.

An eighteenth aspect relates to a method of forming an aperture in a ceramic matrix composite material, the method comprising: applying a backing material to a surface of the ceramic matrix composite material; drilling a pilot hole into the ceramic matrix composite material opposite from the backing material; spiral machining the pilot hole to enlarge a diameter of the aperture, wherein the enlarged pilot hole is the aperture in the ceramic matrix composite material; and removing the backing material from the ceramic matrix composite material after the spiral machining.

A nineteenth aspect relates to the method of any preceding aspect wherein the backing material is fiberglass.

A twentieth aspect relates to the method of any preceding aspect wherein the backing material is fiberglass.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of forming an aperture in a ceramic matrix composite material, the method comprising:

drilling, by a first tool, a pilot hole into the ceramic matrix composite material;

positioning a second tool within and extending beyond a distal end of the pilot hole; and rotating the second tool within the pilot hole while simultaneously traversing the second tool in a spiral cutting path radially outward within the pilot hole to enlarge a diameter of the pilot hole while only applying a force to the ceramic matrix composite material in a radial direction, wherein the enlarged pilot hole is the aperture in the ceramic matrix composite material.

2. The method of claim 1, wherein the diameter of the pilot hole is 50%-70% of a final diameter of the aperture.

3. The method of claim 1, wherein the traversing by the second tool in the spiral cutting path radially outward within the pilot hole is in-plane spiral machining.

4. The method of claim 1, wherein the second tool is a diamond milling tool.

5. The method of claim 1 further comprising, creating, by the second tool, a chamfer on either end of the aperture during the rotating and the traversing.

6. The method of claim 1, wherein the second tool includes a first diameter in a section of the second tool and a second diameter on one or more sides of the section of the second tool, wherein the second diameter is larger than the first diameter.

7. The method of claim 6, wherein a shape of the second tool formed by the first and the second diameter creates a chamfer feature on the one or more sides of the section of the second tool.

8. The method of claim 1, further comprising applying a backing material to the ceramic matrix composite material, wherein the backing material covers an area of the aperture to be formed.

9. The method of claim 8, wherein the backing material is fiberglass.

10. The method of claim 8 further comprising holding the backing material in place by clamps.

11. The method of claim 8 further comprising removing the backing material after the drilling of the pilot hole.

12. The method of claim 1, wherein the first tool is a laser microjet.

13. The method of claim 1, wherein the first tool is a diamond tool.

14. The method of claim 1, wherein the ceramic matrix composite material is a part of a turbine engine component.

15. The method of claim 1, wherein drilling the pilot hole comprises drilling, by the first tool, the pilot hole from a first side of the ceramic matrix composite material through to a second side of the ceramic matrix composite material.

16. A method of forming an aperture in a ceramic matrix composite material, the method comprising:

drilling, by a first tool, a pilot hole into the ceramic matrix composite material;

positioning a second tool within and extending beyond a distal end of the pilot hole; and rotating the second tool within the pilot hole while simultaneously traversing the second tool in a spiral cutting path radially outward within the pilot hole to enlarge a diameter of the pilot hole while only applying a force to the ceramic matrix composite material in a radial direction, wherein the enlarged pilot hole is the aperture in the ceramic matrix composite material, and wherein the second tool has a first diameter in a section of the second tool and a second diameter on one or more sides of the section of the second tool, wherein the second diameter is larger than the first diameter.

17. The method of claim 16 wherein the second diameter is disposed at an end of the aperture.

18. A method of forming an aperture in a ceramic matrix composite material, the method comprising:

applying a backing material to a surface of the ceramic matrix composite material;

drilling, by a first tool, a pilot hole into the ceramic matrix composite material opposite from the backing material;

removing the backing material from the ceramic matrix composite material after the drilling of the pilot hole;

positioning a second tool within and extending beyond a distal end of the pilot hole; and rotating the second tool within the pilot hole while simultaneously traversing the second tool in a spiral cutting path radially outward within the pilot hole to enlarge a diameter of the pilot hole while only applying a force to the ceramic matrix composite material in a radial direction, wherein the enlarged pilot hole is the aperture in the ceramic matrix composite material.

19. The method of claim 18 wherein the backing material is fiberglass.

20. The method of claim 18, wherein the surface of the ceramic matrix composite material is uneven, and wherein the backing material is a rubber material configured to conform to the uneven surface of the ceramic matrix composite material.

* * * * *